United States Patent [19]

Rozier et al.

[11] 4,133,994

[45] Jan. 9, 1979

[54] CELL OF LOW-VOLTAGE FEED AND DISTRIBUTION CELLULAR SWITCHBOARD

[75] Inventors: Paul Rozier, Chalon sur Saone; Jean Granson, Saint Quentin, both of France

[73] Assignees: Delle-Alsthom S.A, Villeurbanne; Unelec S.A., Paris, both of France

[21] Appl. No.: 834,884

[22] Filed: Sep. 20, 1977

Related U.S. Application Data

[63] Continuation of Ser. No. 657,298, Feb. 11, 1976, abandoned.

[30] Foreign Application Priority Data

Feb. 20, 1975 [FR] France .................... 75 05299

[51] Int. Cl.² .............................................. H01H 9/02
[52] U.S. Cl. ................................. 200/307; 200/293; 220/4 R; 361/338; 361/391

[58] Field of Search ............... 307/113; 200/293, 294, 200/306, 307, 50 C; 220/4 F, 4 R; 206/509, 511, 512; 361/331, 332, 338, 356, 357, 365, 391, 394, 390, 392, 393, 383, 335, 429

[56] References Cited

U.S. PATENT DOCUMENTS

| 2,922,081 | 1/1960 | Dubin | 361/391 |
| 3,217,211 | 11/1965 | Norden | 317/103 |
| 3,284,151 | 11/1966 | Morrison | 220/4 R |
| 3,562,593 | 2/1971 | Bould | 317/103 |
| 3,717,805 | 2/1973 | Gnaedinger | 361/338 |

Primary Examiner—Gerald P. Tolin
Attorney, Agent, or Firm—Haseltine, Lake & Waters

[57] ABSTRACT

Cell of low-voltage feed and distribution cellular switchboard, characterized in that it comprises, superimposed one above the other, horizontal metallic casings enclosing switching devices and functional units connected therewith.

9 Claims, 18 Drawing Figures

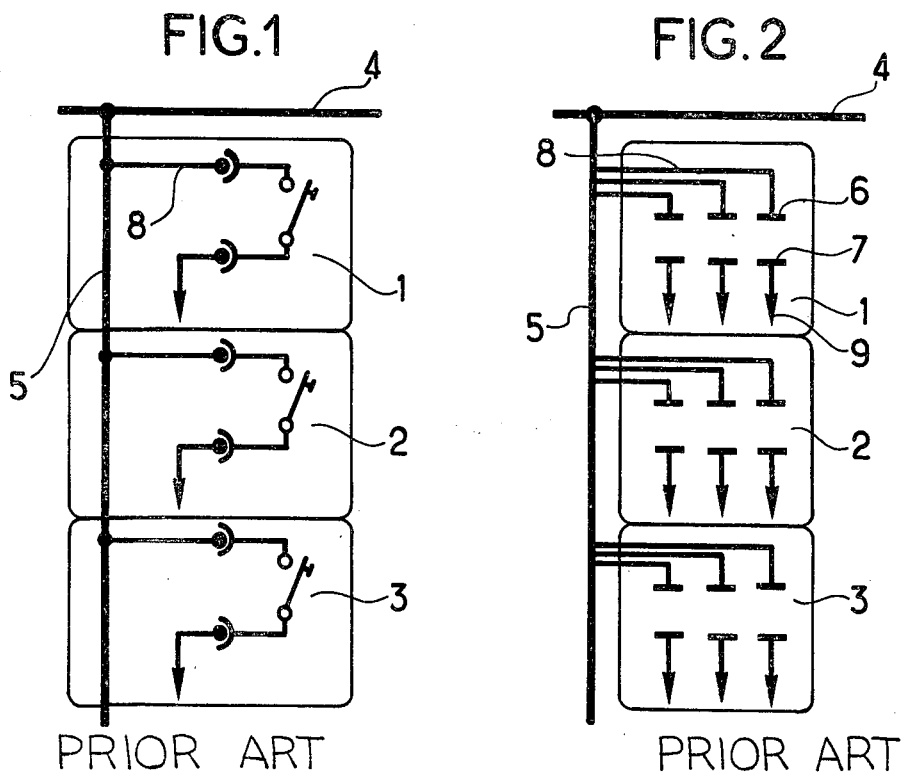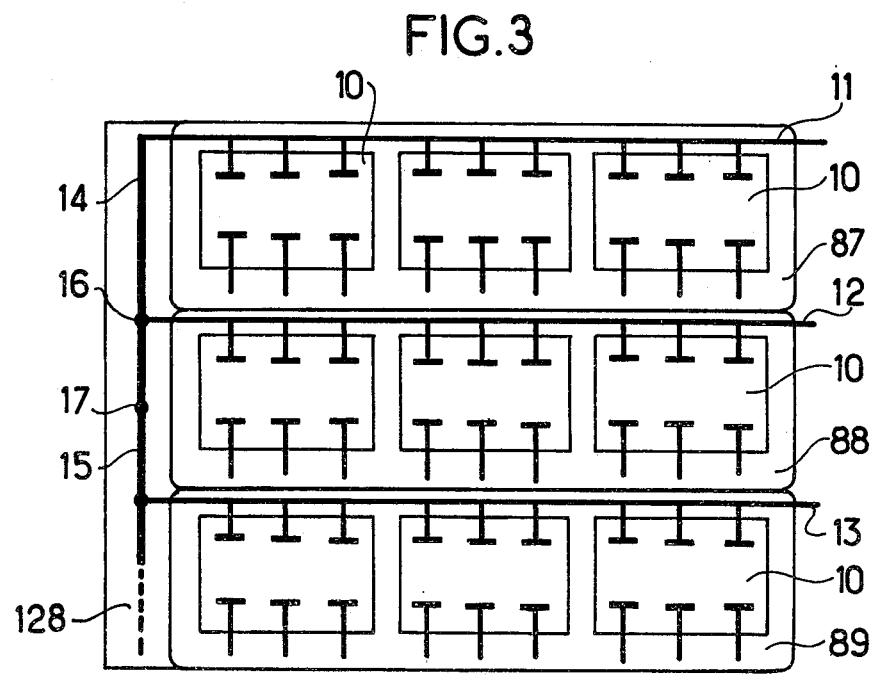

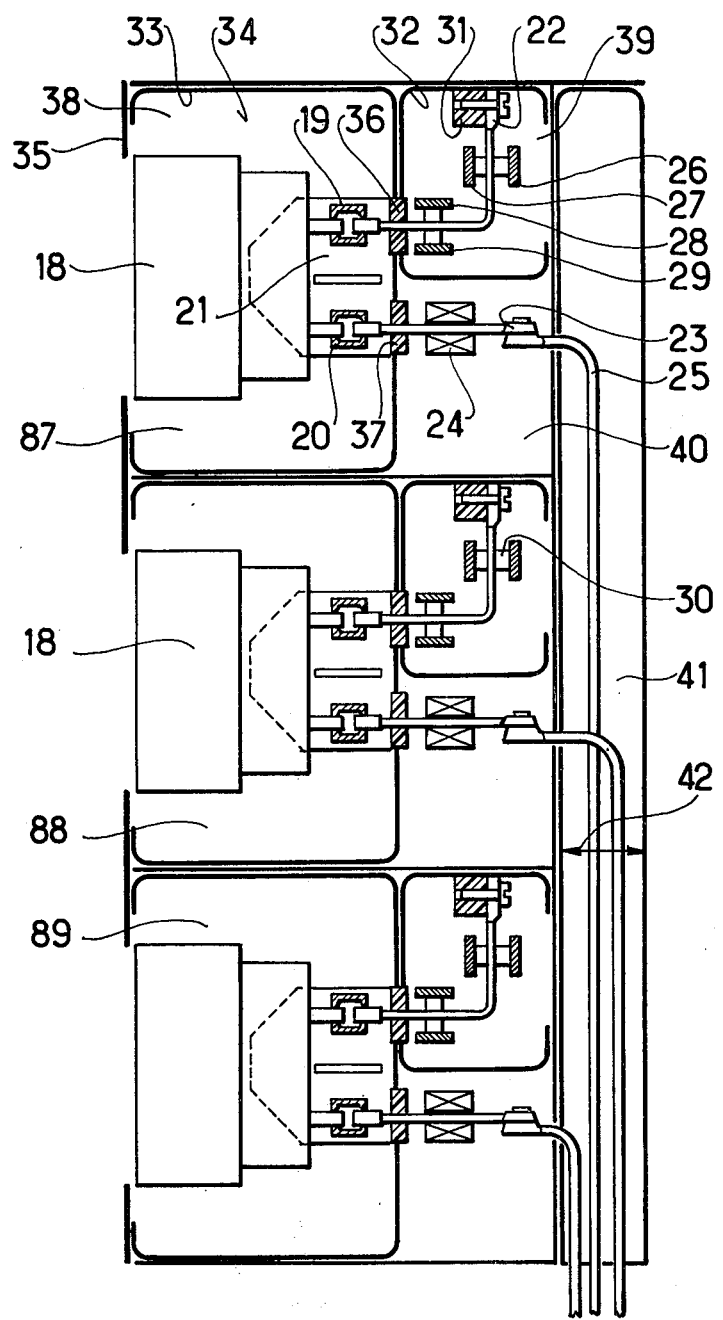

1

CELL OF LOW-VOLTAGE FEED AND DISTRIBUTION CELLULAR SWITCHBOARD

This is a continuation of application Ser. No. 657,298, filed Feb. 11, 1976, now abandoned.

The majority of cells of low-voltage cellular switchboards contain several devices arranged one above another. This solution generally leads to the supplying of these devices by vertical conductors which are, the more often, designed for the sum of the rated currents of the devices. These conductors constitute the auxiliary busbar system of the cell, itself supplied by the busbar system of the switchboard, which is generally horizontal. Connections (which are relatively long and often have a complex-shape connect the individual devices to the auxiliary busbar system of the cell. The volume and the price of the metal of the set connections of the switch board main and auxiliary busbar systems and individual connections) are generally appreciably greater than those of the set of devices incorporated in the switchboard. Moreover, the internal arrangement of the cells often makes the propagating of arcs in switchboards easier when these latter comprise several devices and are not suitably partitioned.

Great improvements in the structure of vertical distribution cells have already been made by the applicant: use of the moulded partitioning blocks between devices and busbar systems and as provided for in French certificate of addition No. 85,783 to French patent No. 1,388,885, assembling in the cells of the elements after a rotation through ninety degrees, this enabling shorter connections to the vertical set of bars without a change in plane.

Nevertheless, this latter arrangement leads to less favourable cooling conditions for the elements and an increase in the price of the mechanical controls especially for high rated current values in steady state and short-circuit currents.

The arrangement of the component according to the invention aims simultaneously at avoiding the rotating through ninety degrees of the equipment and the disadvantages thereof and at reducing the volume and the complication of the set of connections of the switchboard.

The object of the invention is a cell of low-voltage feed and distribution cellular switchboard characterized in that it is formed by superimposing, one above the other, of horizontal metallic casing enclosing switching devices and units connected with those switching devices.

A metallic casing can, more particularly, contain a set of horizontal bars and the bars of the set of bars can be assembled directly on the connections constituting the plug-in pins of the cut-out elements.

The characteristics and advantages of the invention will become apparent from the description of various embodiments given by way of an exemple and illustrated in the drawings.

FIG. 1 is a diagram of a conventional cell.

FIG. 2 is a diagrammatic view of the front face of the same cell.

FIG. 3 is a diagrammatic view of the front face of a cell according to the invention.

FIG. 4 is a cut-away view of a cell according to the invention.

Figure 5:
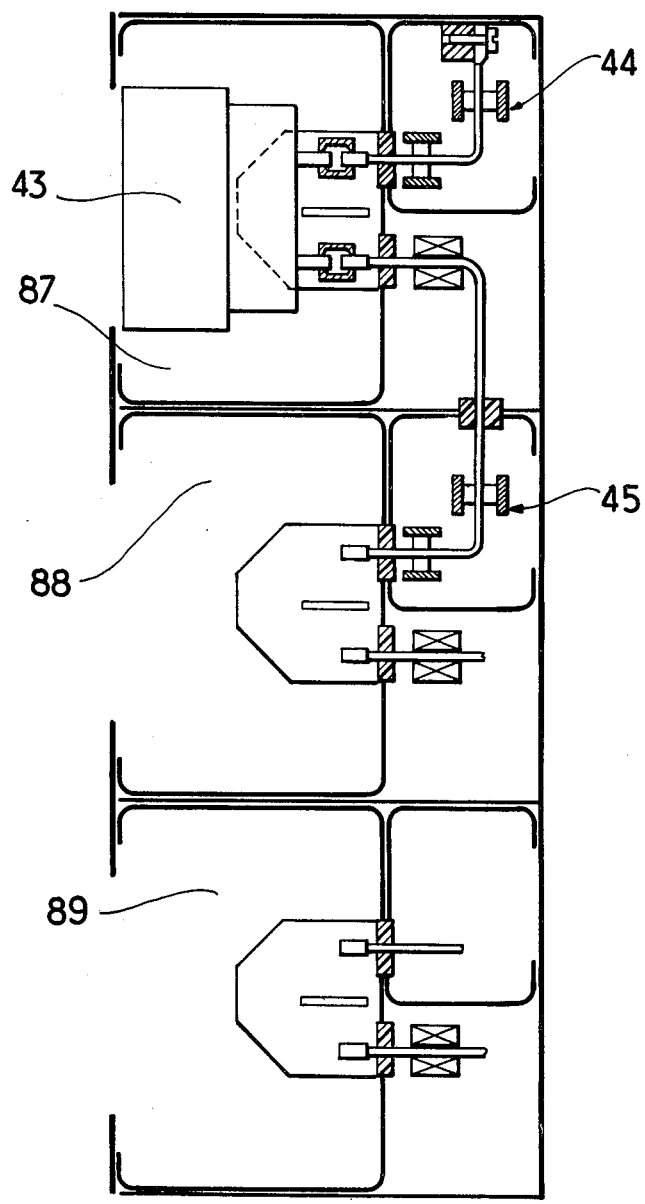

FIG. 5 corresponds to a cell forming a coupling of two busbar systems by a circuit-breaker.

Figure 6:
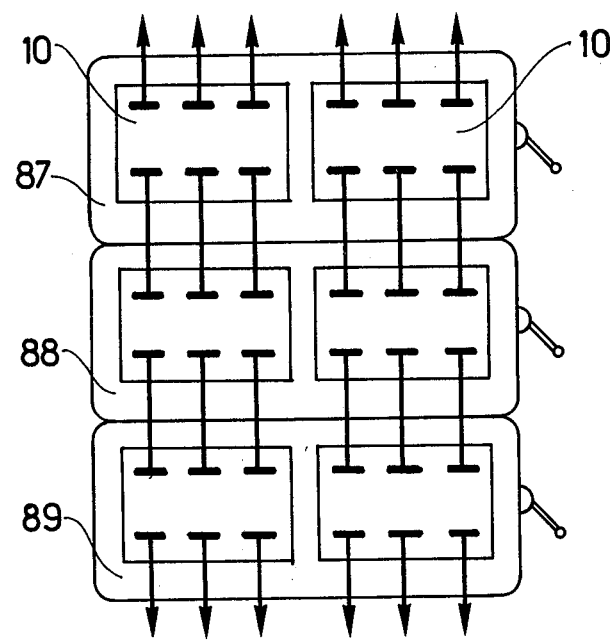

FIG. 6 corresponds to a cell having two inputs and a high-intensity coupling.

Figure 7:
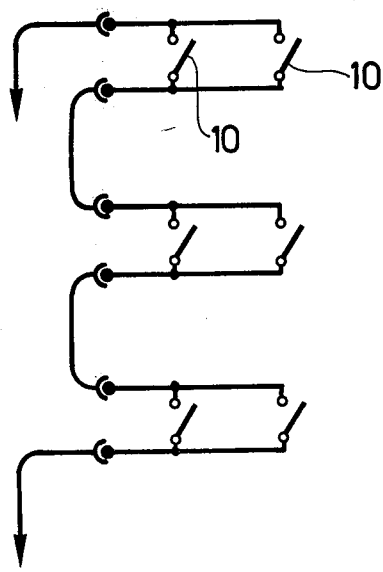

FIG. 7 corresponds to the equivalent diagram of the cell in FIG. 6.

Figure 8:
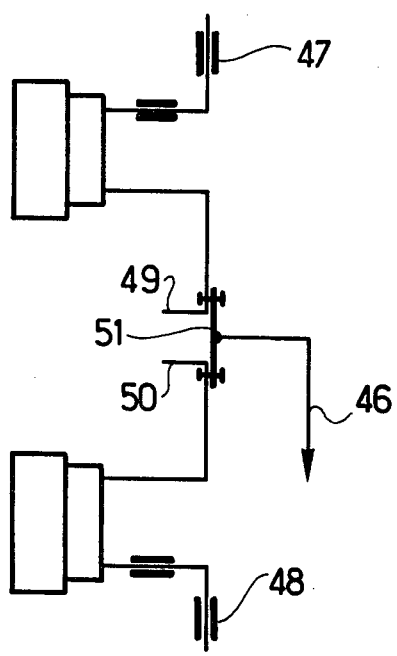

FIG. 8 corresponds to a cell having outputs connected to two sets of bars.

Figure 9:
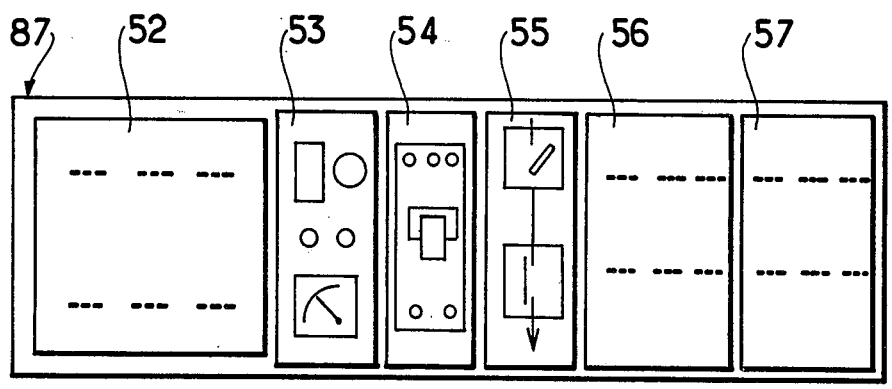
Figure 10:
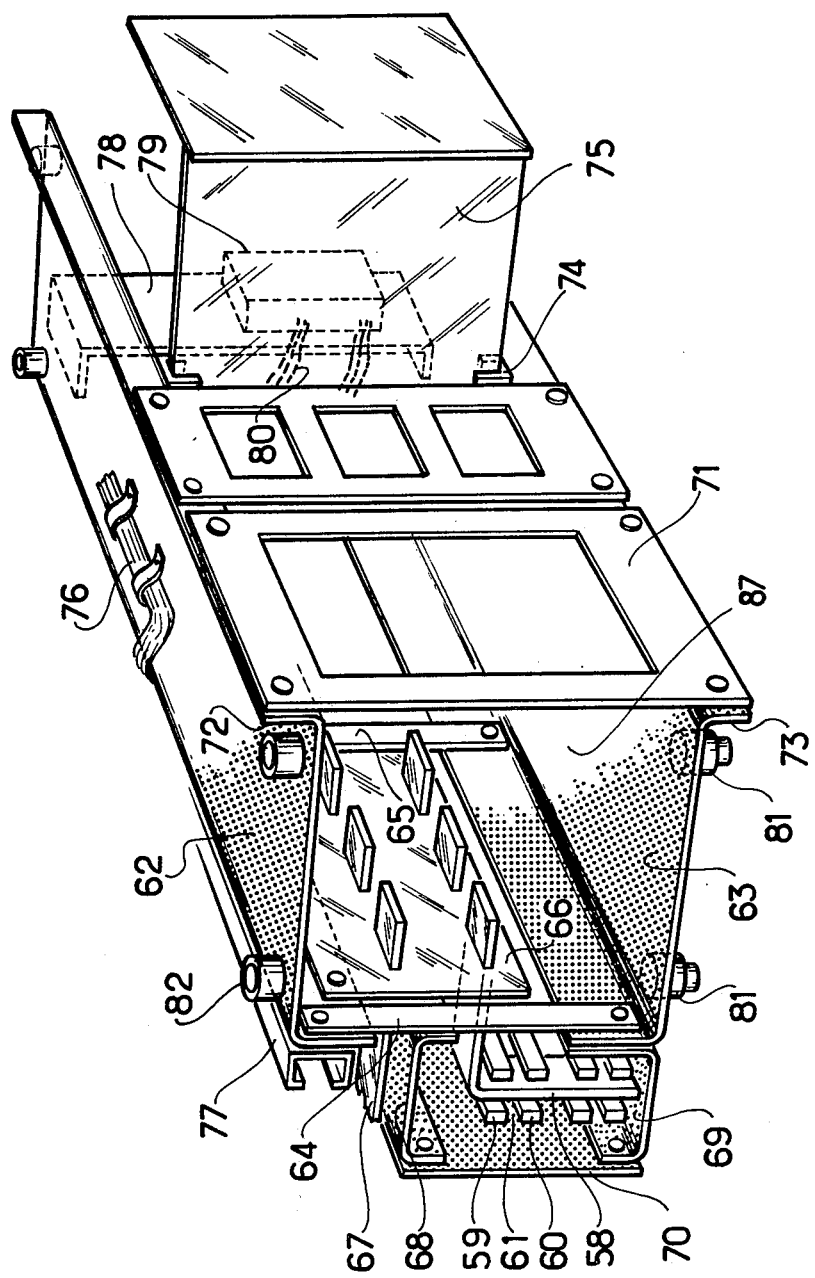

FIG. 9 is a front view of an example of equipment in a casing having a horizontal axis, comprising various types of units and FIG. 10 is a perspective view thereof.

Figure 11:
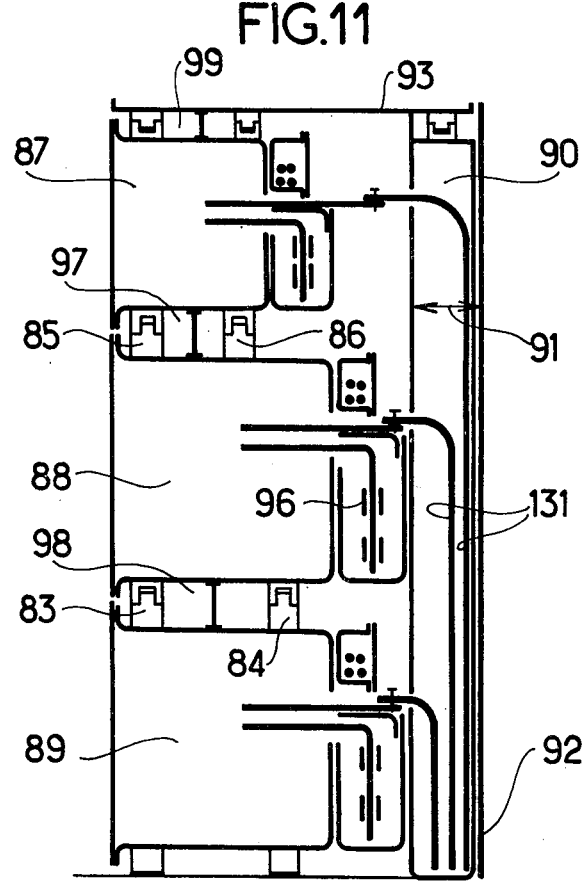

FIG. 11 is a cut-away view of an assembly comprising three cells.

Figure 12:
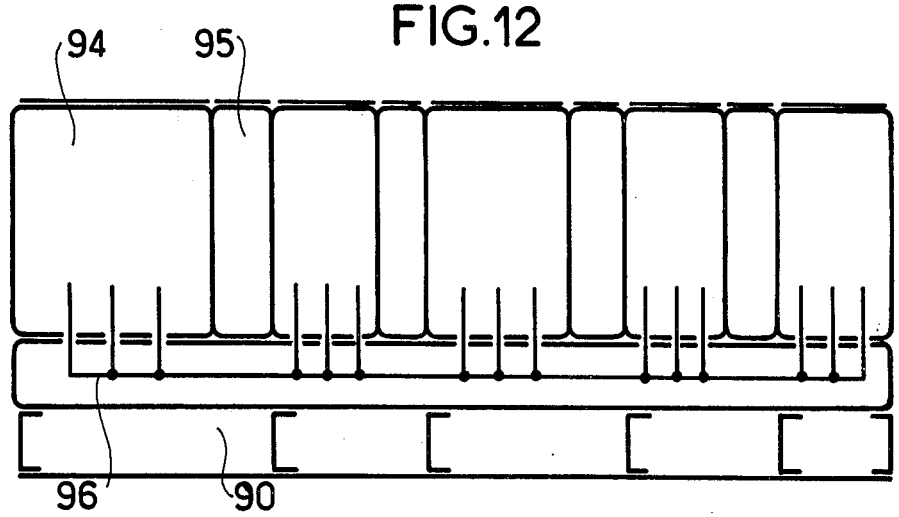

FIG. 12 is a cut-away view of FIG. 11 through a horizontal plane.

Figure 13:
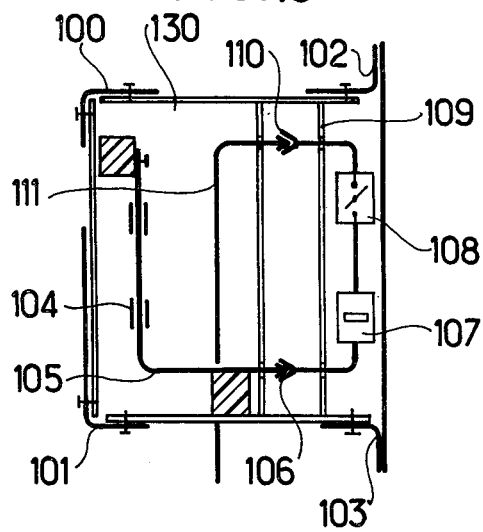

FIG. 13 is a cut-away view of a motor start-up cell.

Figure 14:
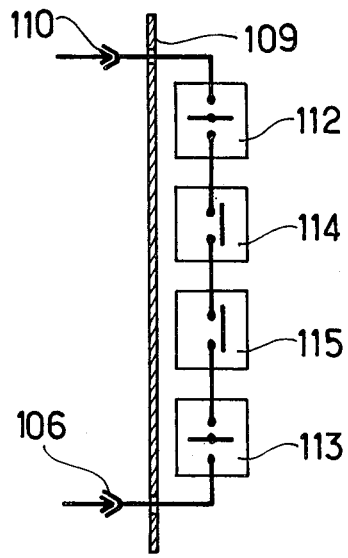

FIG. 14 is a diagram of a combination comprising contactors and isolators.

Figure 15:
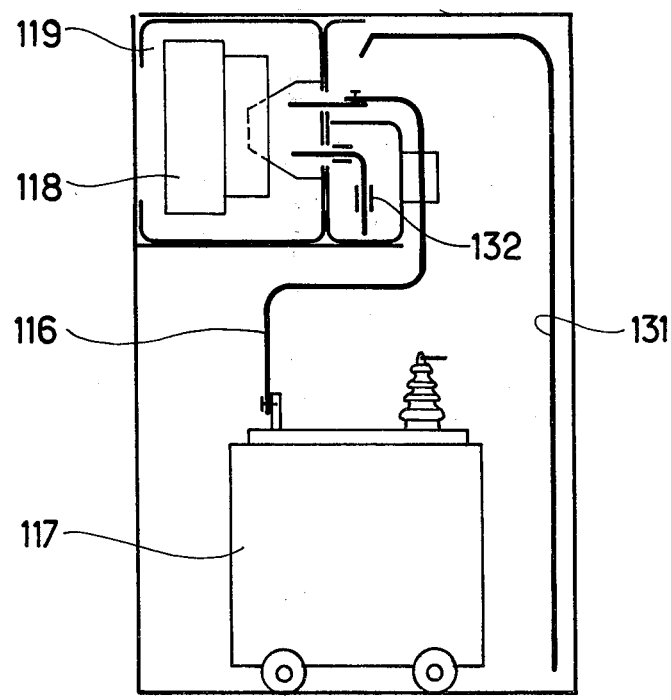

FIG. 15 is a cut-away view of a transformer cell containing units according to the invention.

Figure 16:
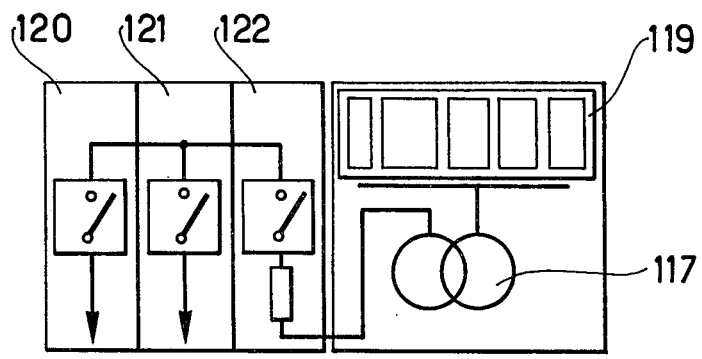
Figure 17:
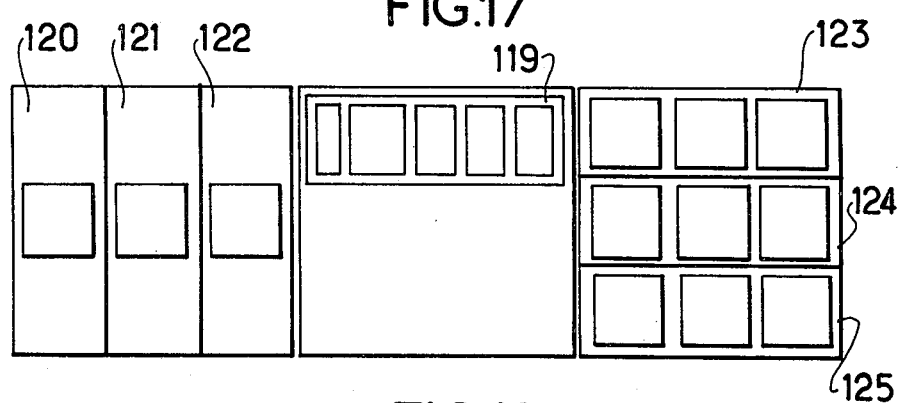
Figure 18:
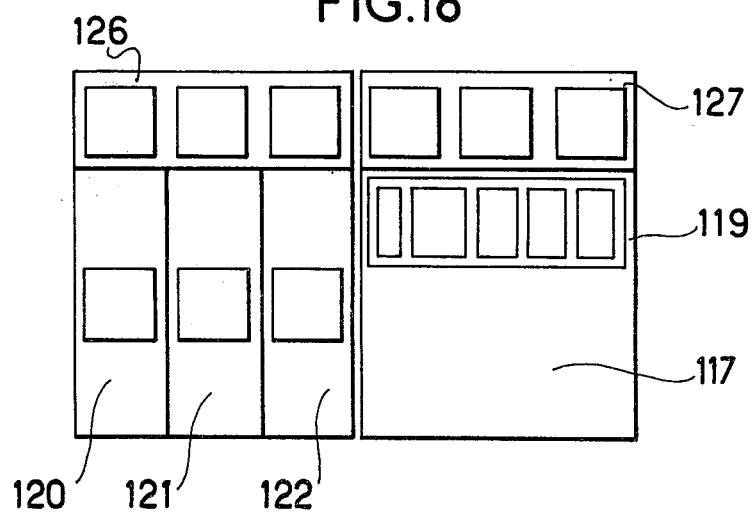

FIGS. 16, 17, and 18 are diagrammatic front views of transformation assemblies comprising cells of equipment according to the invention.

FIGS. 1 and 2 concern a conventional vertical distribution cell comprising three elements 1, 2 and 3. The main set of bars 4 of the switchboard is horizontal and feeds the vertical distribution wires such as 5 which constitute the set of auxiliary bars of each cell. Each major device (circuit-breakers, for example) is in the form of a parallelepiped comprising three inputs such as 6 and three outputs such as 7, arranged in the form of two horizontal rows. The inputs 6 are connected to the vertical distribution wire 5 by connections 8 which are generally fairly long and expensive. The outputs 7 are connected to the output cables 9.

The cell shown in FIG. 3 is constituted by superimposing, in a vertical plane, three horizontal casings 87, 88, 89 according to the invention, each containing three switching elements such as circuit-breakers 10, arranged horizontally side by side. Thus, a switchboard comprising nine elements is formed on the front face 128 of the component.

Each group of three elements such as 10 is connected to a horizontal set of bars 11, 12 or 13. Each set of bars 11, 12 and 13 is connected to vertical conductors 14, 15, constituting a single vertical distribution circuit which can be situated at any point of the switchboard and more particularly at the output of the transformer which feeds the switchboard.

In relation to the conventional solution in FIGS. 1 and 2 and to the solution of French certificate of addition No. 85,783, that arrangement has the advantage of enabling, simultaneously:

The use of mass-produced elements in their normal position, hence making it possible to obtain the best cooling conditions and the most simple mechanical configurations;

The reducing to a minimum of the length of the connections between elements and the sets of auxiliary horizontal bus bar systems;

The sets of horizontal bars can supported directly by the connections of the elements;

Moreover, by feeding the conductors of the vertical distribution circuit at two thirds of the height of the switchboard, at the point 16, or even at half the height of the switchboard, at the point 17, the cross-section of the conductors 14 and 15 of the vertical distribution circuit can be very substantially reduced, since only a third of the current I feeding the switchboard flows through each set of horizontal bars 11, 12 and 13.

In FIG. 4, which is a cut-away view of a cell according to the invention and analogous to that shown diagrammatically in FIG. 3, each casing 87, 88 and 89 having a horizontal axis comprises;

An unpluggable circuit-breaker 18 fitted with clip contacts 19 and 20 sliding on a frame 21, which comprises all the conventional assessories: guide elements, extracting mechanism, auxiliary contacts . . . ;

The elbow connections connecting the circuit-breaker to the set of horizontal bar;

The output connections 23 supporting the current transformers 24 and the terminals for connecting to the cables 25.

The horizontal distribution bars 26, 27, 28 and 29 in the case of a quadripolar circuit-breaker, are supported directly, two by two, by the two branches of the angle brackets formed by the connections 22 of the circuit-breaker, by means of insulating elements such as 30 (except when the connection and the bar have to be connected to each other). The connections 22 are juxtaposed in fours at the output of the circuit-breaker in the case of the quadripolar circuit-breaker.

The connections 22 are all identical and comprise the same bend and the same drilling. One of their ends is fixed on an insulating bar 31. The other end is used as a plugging-in zone for the clip contact 19 of the circuit-breaker, this making it possible to connect that contact directly to the set of horizontal bars.

The bars 26, 27, 28 and 29 can also be made interchangeable and, more particularly, each be constituted by two half-bars assembled without drilling on the connections 22.

Each casing having a horizontal axis comprises, essentially, a bar housing 32 containing the bars 26, 27, 28 and 29. The front housing 33 supporting the plugging-in frames 21 and constituting the casing of the circuit-breakers 18 is set back with that housing 32. The housing 33 also supports the partitions 34 for separation between circuit-breakers and the end partitions of the switchboard as well as the metal sheets 35 which constitute the front face of the switchboard.

The insulating supports 36 and 37 of the plugging-in pins constitute a screen between the compartments 38 of the equipment, the compartment 39 of the set of bars and the compartments 40 of the output of the cables. These latter compartments are completed by a vertical cable housing 41 whose depth can vary as a function of the number of cables.

The spacing out of the volumes of the compartments 39 of the sets of bars and 40 of the cable outputs inside each of the casings having a horizontal axis can differ and the compartments 39 and 40 can be inverted in one or several of the horizontal casings (upper, middle, lower).

FIG. 5 shows that a coupling can easily be effected by a circuit-breaker 43 between two sets of bars 44 and 45, belonging to two casings 87 and 88.

FIG. 6 is an example of a cell comprising two inputs and a high current coupling between casings 87, 88 and 89. That configuration is made possible due to the fact that, in a same horizontal casing, two circuit-breakers having a rating corresponding to a current I can be mechanically and electrically coupled together to provide, in a similar geometrical configuration an element having a rating of 2 I. In an analogous configuration taking n circuit-breakers having a rating of I, an element having a rating of n I can be provided. The equivalent diagram corresponding to FIG. 6 and shown in FIG. 7 shows that by using, in the cell, three sets of bars in a horizontal casing, one set of bars can easily be coupled to another, passing through one, two or n circuit-breakers.

Likewise these combinations of sets of bars in a horizontal casing can be used to form cells comprising two or three independent sets of bars. Thus, for example, it is possible, as shown in FIG. 8, to form outputs 46 attached to two sets of bars 47 and 48 by connecting each output to the connections 49 and 50 of the central casing, short-circuited at 51. It is also possible to use an analogous circuitry to effect a two-bridge direct-current distribution.

Inside a same horizontal casing 87 it is possible as shown in the front view in FIG. 9, to arrange and connect to a same set of bars, several functional elements or units 52, 53, 54, 55, 56 and 57, such as ordinary circuit-breakers or circuit breakers in moulded housings alone or combined with cut-out switches, contactors combined with fuses relay or automatic equipment panels.

FIG. 10 shows a perspective view of the technological details of embodiments of the horizontal casing 87 of the bars, of the elements and of the connections corresponding to FIG. 9.

The installing in each horizontal casing, of the functional elements or units must be possible in any order and whatever the width of each unit, without its being necessary to prepare, previously, the set of bars, the main casing and its front face, as a function of the arrangement provided for.

The three or four bars (three-phases plus, contingently, the neutral) of the set of bars are supported directly by the elbow connections 58 onto which the circuit-breaker is plugged. Each bar comprises, in parallel, two conductors 59 and 60, separated by a gap 61 having a constant width. Through this gap, a bolt making it possible to connect the conductors of the bar to the connection of the element can be made to pass, at any point of the horizontal gap between the bars.

The main structure of the horizontal casing 87 comprises two folded members 62 and 63 preferably made from perforated aluminum sheets. Those folded members are assembled at intervals by bolted spacing elements such as 64 and 65, arranged between the units provided. Insulating plates such as 66 which support the fixed plug-in contacts of the elements are fixed between the pins. The plates 66 stop up the space separating the folded members 62 and 63 and are crossed by the connections 58 and 67 which connect the equipment, on the one hand to the set of bars 59, 60 and, on the other hand, to the output, by bar or by cable. The set of bars 59, 60, assembled on the connections 58, is protected against accidental contacts preferably by two folded members 68 and 69 and a rear plate 70 made of perforated aluminum sheet. The perforations in the aluminum sheet make it possible to install functional elements and units side by side, lengthwise, at any point of the horizontal casing, without its being necessary previously to machine or prepare the main metallic structure. The perforations also make it possible to obtain the best cooling conditions and the most simple mechanical configurations.

Inasmuch as concerns the front face of the cell a panel, such as 71 generally made of sheet metal, corresponding to each unit installed, is fixed on the folded edges 72 and 73 of the main structure, preferably by means of bolts and nuts, called fast-screwing bolts and nuts and arranged in the perforations of the structure.

The axes of those perforations are spaced by a constant quantity which constitutes the "pitch". The distance between the fittings of each panel corresponds to a multiple of the pitch. In these conditions, the front face of the horizontal casing is constituted by the juxtaposing of the elementary front faces of each unit.

The separations between the various functional elements or units are formed by sliding plane metal sheets in the slide grooves 74 fixed on the main structures. These separations are limited by the plane of the front faces which prevent the moving thereof. By making a separation and a front face integral together, a mobile slide 75, guided by a slide groove 74, is formed. At a random point of the horizontal casing, those mobile slides can be connected with any unit and be provided with the corresponding auxiliary equipment.

At the back, the gap situated opposite a slide 75, between the folded members 82 and 83, is not completely stopped up by the insulating plates 66. The part left open allows the wiring to pass in the direction of either the output sheath, or of other components. This wiring is arranged on the outside of the structure, either in the direction of 76 between two superimposed horizontal casings, or in a sheath 77 preferably fixed at the back of the folded member 62.

The arrangments provided for the set of bars, the main structure and its front face make it possible to arrange, side by side, inside the horizontal casing all the units without requiring any special previous investigation for each order. The circuit-breakers constituting the main part of the units, the dimensions of the main structures, determined by those of the folded members 62 and 63 and those of the pins 64 and 65, enable the installing of the circuit-breakers of the greatest rating provided for. Moreover, intermediate mounting plates 78, fixed directly onto the structures, enable the installing of all the elements 79, fixed or detachable, such as small circuit-breakers, switches, contactors combined with fuses . . . The connections between those small elements and the busbar system are effected by cables 80.

Each horizontal casing comprises, at its lower part, feet 81 constituted, for example, by cylinders extended by cones. These feet make it possible to lay the horizontal casing on the ground or when several horizontal casings are superimposed, they fit into hollow cylinders 82 arranged at the upper part of the casing situated below. That arrangement ensures the positioning of the superimposed casings.

As shown in FIG. 11, those positioning members can be more or less distant from each other according to the height of the casing. Thus, positioning members 83 and 84 are more distant from each other than 85 and 86. That arrangement enables the superimposing of the horizontal casings 87, 88 and 89 having different depths corresponding to units having greater or smaller dimensions. Vertical casings, 90, made of perforated metal, whose depth 91 varies as a function of the size and of the number of the cables to be provided, are arranged, in general, for high-power and auxiliary cables 131, at the back of the horizontal casings 87, 88, 89. Preferably, the back of the component is closed by a plane metal sheet 92 and often, the top part is covered by a roof 93 which provides protection against falling water.

FIG. 12 is a plane cut-away view at the level of the horizontal casing 88. Main elements such as 94 accessory units such as 85, connected to a set of bars 96 and to output cables passing in sheaths 90 are arranged side by side in that casing.

The use of members having a perforated sheet metal structure enables the direct removal of the cut-out gases of the circuit-breakers in expansion spaces constituted by separation gaps which can be seen in FIG. 11, namely 97 and 98, comprised between two horizontal casings 87 and 88 and 88 and, 89 or 90 between the horizontal casing 87 and the roof 93.

The arrangement according to the invention can also be used in a great number of particular applications.

FIG. 13 shows a cut-away view of a starting up cell for a motor, constituting a simple, economical solution which can be used on a very versatile basis. The horizontal casing 130 is composed of four folded sheet metal members 100, 101, 102, 103 assembled so as to allow continuous gaps to appear on the upper and lower faces of the cell. The set of bars 104, installed inside the cell, is fixed directly onto the elbow connection 105 connected to the plug-in contact 106. The units : switch 107 combined with a fuse and contactor 108 are fixed to a vertical mounting plate 109, on whose back face are installed the plug-in contacts 106 and 110. The output cable 111 which passes through the lower bottom of the cell is connected to the latter contact.

In a variant, the units fixed to the mounting plate 109 can be installed as shown in the diagram 14. In that arrangement, the contactors 112 and 113 between which are situated two isolators 114 and 115 can easily be isolated, this making it possible to carry out all the operating manoeuvres without moving the support plate 109.

The output of the cables through the lower bottom of the switchboard and the use of the horizontal casings made of perforated metal described previously make it possible to produce easily, economically and without great investment, wall switchboards having a very slight bulk in depth, superimposing several casings, as well small distribution switchboards generally formed by an alinement of juxtaposed boxes. The horizontal casings can also be used as a distribution element in a network of prefabricated sheaths, in switchboard of medium-voltage contactors and in wall switchboards of low-voltage connectors.

Very oten, a large volume at the top part of the protected prefabricated cells of transformers is unused. As shown in FIG. 15, a horizontal casing 119 connected directly to the low-voltage terminals of a transformer, can be installed in that volume. For a subscriber's set, the horizontal casing 119 comprises : the main circuit-breaker, which can be cut off, the output equipment and the isolation control equipment. The connection 116 connects the transformer 117 to the main circuit-breaker 118, connected with the horizontal casing 119 and feeding the set of bars 132 of the prefabricated assembly. Cables 131, arranged at the back of the transformer cell, connect the other outputs to that set of bars by means of circuit-breakers or switches. For a public distribution set, the horizontal casing comprises : the general low-voltage switch, the set of bars and the outputs switches.

FIGS. 16, 17 and 18, show a few arrangements of sets using horizontal casings containing low-voltage equipment. FIG. 16 is a front view of a set comprising the cell in FIG. 15 with its transformer 117 and its horizontal casing 119, as well as the medium-voltage feeding system of the transformer : loop components 120 and 121 and transformer protection component 122.

In FIGS. 17 and 18, the medium-voltage feeding system 120, 121, the protection component 122 and the transformer 117 are identical to the units in FIG. 16; but the low-voltage switchboard, which always comprises a horizontal casing 119 integrated with the transformer cell as in FIGS. 15 and 16, has been developed by adding:

In FIG. 17, an extra low-voltage table comprising three superimposed horizontal casings 123, 124 and 125;

In FIG. 18, two extra horizontal casings 126 and 127 arranged respectively above the medium-voltage cells and above the transformer cell.

In the case of FIGS. 16 and 18, the installing of the low-voltage part is effected without increasing the ground surface necessary for the medium-voltage equipment and the transformer. In the examples in FIGS. 16 to 18, the depth necessary for the installing of the set, including the access to the back of the low-voltage part, is reduced to the minumum due to the slight dimensions of the low-voltage horizontal casings.

The horizontal metallic casings according to the invention, busbar system of bars and low-voltage equipment, have the following advantages:

These devices can receive any combination of automation or logic functional elements and units, from the largest to the smallest, without modification of the principles of presentation, assembling and partitioning;

Production requires only a small amount of tooling since the structures are constituted by folded series perforated metal, the bars are not machinex and the front faces are plane metal sheets which can be prelacquered. The elements can be kept in stock and assembled directly in situ:

The use of perforated metal sheets provided with screws or clips having the same pitch as the perforations and with fittings for elements corresponding to the multiple of the pitch avoids the necessity of special investigations for each order and the machining of the structures and allows simple assembling. Modifications in position during manufacturing or in situ, as well as extensions, are easy and do not require any special preparation for any elements whatsoever;

Perforated structures ensure proper ventilation and make it possible to increase the permissible intensity in the conductors. Moreover, the perforations can easily be stopped up in places by means of thin flat metal sheets;

Aluminium casings avoid the necessity of painting and constitute good earth circuits cancelling the necessity for special earth circuits;

Each unit connected to the set of bars, comprises, also the cable output connections;

The horizontal casings can easily be superimposed and can constitute switchboards having one or several sets of bars. Cylindro-conical positioning members make it easy to install superimposed elements. Inside each casing, In rated units can be coupled mechanically and electrically to form a unit having a rating of n In. The device according to the invention enables coupling between partial sets of bars at any point on the switchboards, as well as the forming of switchboards having several independent sets of bars and of switchboard having two sets of bars per output.

The depth of the switchboards is the slightest possible and the sheaths of cables, formed by the adding of a minimum number of elements, have a variable depth. The forming of the outputs or sheaths for wiring is simple.

In each horizontal casing, the distribution bars are supported directly by the plug-in zones of the switching devices, this simplifying the structure.

The supports of the plug-in pins of the switching devices constitute a screen between the compartment of the element and the busbar system, this reducing the danger and the propagation speed of a flashover.

The cut-out gases of the switch-off device can be removed directly through the perforated structures towards an expansion space comprised between two horizontal casings or between a casing and the roof of the switchboard.

Inside each casing, the compartments of the bars and those of the cable outputs having the same volume can be interchanged.

The horizontal casings can constitute the whole low-voltage equipment of the subscriber or public distribution transformation components and can be installed either inside the transformer cell or on the roof of the transformer cells or medium-voltage cells of the set.

It is evident that the invention is no way limited to the embodiments which have just been described and illustrated and which have been given only by way of an example; more particularly, without going beyond the scope of the invention, certain arrangements can be modified or certain means can be replaced by equivalent means, or, even, certain elements can be replaced by others capable of fulfilling the same technical function or an equivalent technical function.

We claim:

1. A cell of low-voltage supply and distribution cellular switchboard comprising metallic casings stacked one above the other, switching devices enclosed by each of said casings, said metallic casings each comprising: bolted spacing elements, and metallic sheets with venting perforations, said sheets folded and fixed together at intervals by said bolted spacing elements by means of the bolts passing through the venting perforations of said metallic sheets.

2. A cell according to claim 1 wherein said bolted spacing elements are fixed by said perforations in substantially any place of the cell, said metallic sheets enabling direct removal of cut-out gases of said switching devices in expansion spaces.

3. A cell according to claim 1 including insulating plates between said spacing elements, and front face panels fixed on folded ends of said metallic sheets, expansion space means for receiving cut-out gases of said switching devices, said metallic sheets forming the inside of said metallic casings and communicating with said expansion space means, a roof adjacent the upper one of said casings, said expansion space means comprising a space between said upper casing and said roof means, switching devices in said metallic casings and mounted at locations corresponding to multiples of spacing of the perforations of said metallic sheets, an assembling element carried by said metallic casing at the top and bottom thereof, said assembling element providing for installation and assembly of said casing, said bolted spacing element being fixed by said perforations in substantially any place of the cell, said metallic sheets enabling direct removal of cut-out gases of said switching devices in expansion spaces.

4. A cell according to claim 1 including insulating plates between said spacing elements, and front face panels fixed on folded ends of said metallic sheets.

5. A cell according to claim 4 including expansion space means for receiving cut-out gases of said switching devices, said metallic sheets forming the inside of said metallic casings and communicating with said expansion space means.

6. A cell according to claim 5 wherein said expansion space means comprises a space between two stacked casings.

7. A cell according to claim 5 including a roof adjacent the upper one of said casings, said expansion space means comprising a space between said upper casing and said roof means.

8. A cell according to claim 1 wherein said switching devices in said metallic casings are mounted at locations corresponding to multiples of spacings of the perforations in said metallic sheets.

9. A cell according to claim 1 including assembling elements carried by said metallic casings at the top and bottom thereof, said assembling elements providing for installation and assembly of said casings.

* * * * *